(12) United States Patent
Schellens

(10) Patent No.: US 11,305,824 B1
(45) Date of Patent: Apr. 19, 2022

(54) ELEVATED ACCESSORY MOUNTING PLATFORM FOR A VEHICLE

(71) Applicant: Thomas E. Schellens, Old Lyme, CT (US)

(72) Inventor: Thomas E. Schellens, Old Lyme, CT (US)

(*) Notice: Subject to any disclaimer, the term of this patent is extended or adjusted under 35 U.S.C. 154(b) by 167 days.

(21) Appl. No.: 16/790,499

(22) Filed: Feb. 13, 2020

Related U.S. Application Data

(60) Provisional application No. 62/813,090, filed on Mar. 3, 2019.

(51) Int. Cl.
| | |
|---|---|
| *B62D 33/023* | (2006.01) |
| *B60Q 1/26* | (2006.01) |
| *B60R 9/058* | (2006.01) |
| *B60R 11/00* | (2006.01) |
| *B60R 9/052* | (2006.01) |

(52) U.S. Cl.
CPC ......... *B62D 33/023* (2013.01); *B60Q 1/2611* (2013.01); *B60R 9/052* (2013.01); *B60R 9/058* (2013.01); *B60R 2011/004* (2013.01); *B60R 2011/0047* (2013.01)

(58) Field of Classification Search
CPC ..... B62D 33/023; B60Q 1/2611; B60R 9/058; B60R 2011/004; B60R 2011/0047
See application file for complete search history.

(56) References Cited

U.S. PATENT DOCUMENTS

| | | | | |
|---|---|---|---|---|
| 4,081,095 A | * | 3/1978 | Wilburn | B60R 9/042 414/462 |
| 5,346,355 A | * | 9/1994 | Riemer | B60P 1/4435 224/310 |
| 6,158,638 A | * | 12/2000 | Szigeti | B60R 9/042 224/310 |
| 6,428,263 B1 | * | 8/2002 | Schellens | B60R 9/042 224/310 |
| 8,511,526 B2 | | 8/2013 | Schellens | 224/326 |
| 8,640,933 B1 | * | 2/2014 | McCray | B60R 9/042 224/310 |
| 8,646,667 B2 | * | 2/2014 | Wang | B60R 9/042 224/310 |
| 10,479,282 B2 | | 11/2019 | Schellens | B60R 9/04 |
| 10,800,340 B1 | * | 10/2020 | Mayville | B60R 9/045 |
| 2003/0011180 A1 | * | 1/2003 | Coffman | B60R 21/02 280/748 |
| 2003/0071098 A1 | * | 4/2003 | Martin | B60R 9/00 224/405 |

(Continued)

*Primary Examiner* — Brian D Nash
(74) *Attorney, Agent, or Firm* — Fattibene and Fattibene LLC; Paul A. Fattibene

(57) ABSTRACT

A mounting platform attached to a vehicle by existing openings and holes in a truck bed. A base portion having an L-clamp or bolt assembly registered and bolted to the vehicle and is securely held to the bed rails of a pick-up truck. Two formed metal vertical uprights or supports are attached to the base portion. A platform portion is attached to the two upright vertical forms or supports. The mounting platform is used to mount accessories such as light bars, emergency lights, spot lights, antennas, or any other accessory. The mounting platform may be easily installed and removed from the vehicle without any damage or modification to the vehicle and without drilling any additional holes in the vehicle.

13 Claims, 9 Drawing Sheets

(56) References Cited

U.S. PATENT DOCUMENTS

| | | | | |
|---|---|---|---|---|
| 2004/0232718 | A1* | 11/2004 | Kerns | B60R 11/00 296/3 |
| 2005/0036848 | A1* | 2/2005 | Cunningham | F16B 37/045 410/104 |
| 2006/0279099 | A1* | 12/2006 | Ranka | B60R 11/06 296/37.6 |
| 2007/0096486 | A1* | 5/2007 | Niedziela | B60R 11/00 296/3 |
| 2008/0054037 | A1* | 3/2008 | Niedziela | B60R 9/00 224/403 |
| 2010/0096872 | A1* | 4/2010 | Brogdon | B60R 9/00 296/3 |
| 2014/0034694 | A1* | 2/2014 | Laverack | F16B 2/06 224/403 |
| 2014/0034695 | A1* | 2/2014 | Perry | B60R 9/06 224/405 |
| 2016/0059906 | A1* | 3/2016 | Leitner | B60R 11/06 296/3 |
| 2018/0118148 | A1* | 5/2018 | Parzyck | B60R 21/026 |
| 2018/0154817 | A1* | 6/2018 | Chambers | B62D 33/023 |
| 2018/0339658 | A1* | 11/2018 | Frederick | B62D 33/023 |
| 2018/0370447 | A1* | 12/2018 | Schellens | B60R 9/058 |
| 2019/0100253 | A1* | 4/2019 | McKinney | B62D 29/04 |
| 2019/0225166 | A1* | 7/2019 | Williams | B60R 11/06 |
| 2019/0241128 | A1* | 8/2019 | Traxler | B62D 33/023 |
| 2019/0291677 | A1* | 9/2019 | Ajam | B60R 21/13 |
| 2020/0148281 | A1* | 5/2020 | Elder | B60P 7/0807 |
| 2020/0369214 | A1* | 11/2020 | Lloyd | B60P 7/15 |
| 2020/0406985 | A1* | 12/2020 | Zhu | B60P 7/0815 |
| 2021/0053506 | A1* | 2/2021 | Spencer | B60R 11/06 |

* cited by examiner ively illustrates

ELEVATED ACCESSORY MOUNTING PLATFORM FOR A VEHICLE

RELATED APPLICATION

This application claims the benefit of United States Provisional Application No. 62/813,090 filed Mar. 3, 2019 which is herein incorporated by reference.

FIELD OF INVENTION

The present invention relates in general to the attachment of vehicle accessories, and more particularly to the attachment of vehicle accessories without modification or damage to the vehicle.

BACKGROUND OF THE INVENTION

There are many situations where an accessory is desired to be attached to a vehicle. It is often desired to attach light bars, emergency lights, spot lights, antennas or other accessories to a vehicle and, in particular, to the roof of a vehicle. Often, in order to attach these accessories, holes must be drilled in the vehicle, such as in the roof, so as to mount the accessory. The mounting of the accessory by drilling holes damages the surface of the vehicle and lowers the resale value. Additionally, it is often difficult to return the vehicle to the original condition due to the damage caused by mounting the accessory. In many situations, the accessory is only needed for a short period of time. Therefore, it is often desirable to mount and then remove the accessory without modifying or permanently altering or damaging the vehicle. This is particularly applicable to volunteer emergency personnel who may volunteer for a period of time using their own vehicles that must be modified to mount emergency lights.

There have been other devices used to mount accessories to a vehicle. One such device is disclosed in U.S. Pat. No. 8,511,526 entitled "Vehicle Mounting Platform Using Existing Opening" and issuing on Aug. 20, 2013 to Thomas E. Schellens, which is herein incorporated by reference. Therein disclosed is a mounting platform that is attached to an existing brake light opening in a vehicle. Another device to mount accessories to a vehicle is disclosed in U.S. Pat. No. 10,479,282 entitled "Accessory Mount for a Vehicle" issuing on Nov. 19, 2019 to Thomas E. Schellens, which is herein incorporated by reference. Therein disclosed is an accessory mount mountable to a roof of a vehicle with the use of an existing brake light opening. A shaped claim is used to securely attach the accessory mount. While these devices using an existing opening in a vehicle have been very successful, there are instances and need to mount an accessory mount in different locations where an existing opening may not be located.

While there have also been other techniques to temporarily mount emergency lights with magnets and suction cups, they often do not hold sufficiently and therefor often become detached unintentionally. Therefore, there is a need for the mounting of accessories on a vehicle that is secure and yet will not damage the vehicle or require a permanent alteration, such as the drilling of additional holes in the vehicle, and that may be mounted in different locations.

SUMMARY OF THE INVENTION

The present invention provides an elevated mounting platform that is securely attached to a vehicle through use of existing openings. A mounting platform is attached to the vehicle through use of existing openings, such as stake pockets in a pick-up truck bed. A base or foot portion, having an L-clamp inserted into the stake pocket, is secured to the vehicle on both sides at the forward end of the pick-up bed rail. A pair of vertical elements with an attached horizontal platform forms an elevated mounting platform for accessories such as emergency lights, light bars, spot lights, antennas or other similar accessories. The present invention is particularly adaptable to the mounting of a mounting platform just behind the roof of a truck having a bed body.

Accordingly, it is an object of the present invention to attach an accessory to a vehicle without modifying or damaging the vehicle.

It is another object of the present invention to attach an elevated mounting platform to a vehicle through existing opening in a bed rail and interior bed wall.

It is an advantage of the present invention that the mounting platform may be easily installed and removed.

It is a further advantage of the present invention that the mounting platform may be attached to the vehicle without the drilling of any holes.

It is a feature of the present invention that it uses existing features in the vehicle to securely attach the mounting platform.

It is another feature of the present invention that an L-clamp is inserted into the existing stake-pocket opening and securely holds a base portion onto the vehicle for attachment of the platform portion.

These and other objects, advantages, and features will become readily apparent in view of the following more detailed description.

DETAILED DESCRIPTION OF THE PREFERRED EMBODIMENT

The mounting platform of the present invention is preferably made from bent aluminum or extruded aluminum, but can be made from any material, such as metal, plastic, or composite. The component parts may be extruded or molded.

Accordingly, the present invention provides means for attaching a mounting platform to a vehicle without the drilling of any holes. Different clamping arrangements may be provided to attach a base portion to the vehicle through an existing opening, such as the stake pockets in a pick-up truck bed. The present invention may be used for a variety of different applications but is best suited for the attachment of a mounting platform to a truck behind the cab at roof height through the attachment in the forward two stake pockets.

Figure 1:
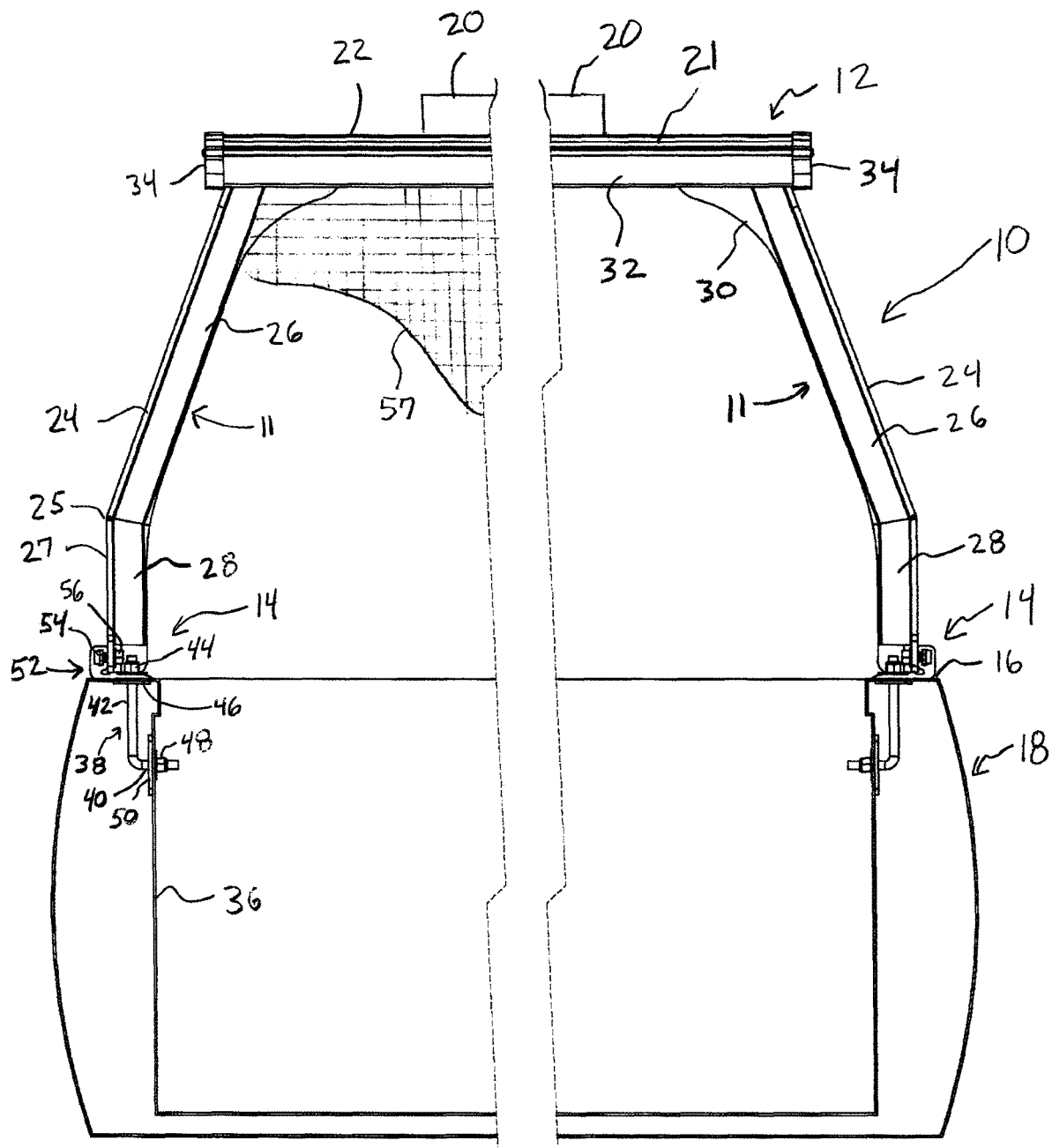
FIG. 1 is a rear elevational view schematically illustrates a mounting platform attached to the bed of a truck.

FIG. 1 schematically illustrates the elevated accessory mounting platform 10 of the present invention attached to a truck bed 18. A platform assembly 12 is attached to opposing supports 11 which are attached to the truck bed 18 with bed attachment assembly 14. Bed attachment assembly 14 is attached to the truck bed rail 16 through existing openings. An accessory or light 20 is attached to the mounting surface 22 of the platform 21.

Each of the supports 11 are shaped or formed pieces preferably made of metal, and more preferably aluminum. The supports 11 are formed with a side support 24 having a fold or crease 25 to form a lower vertical section 27. The lower vertical section 27 is substantially perpendicular to the surface of the truck bed rail 16. An angle support bracket 30 is formed adjacent the platform 21. A horizontal chase 32 is held on a bottom surface of the platform assembly 12. End caps 34 cover the ends of the platform 21. An upper vertical chase 26 is open to horizontal chase 32 and runs adjacent the side support 24 into lower vertical chase 28. The chases 26, 32, and 28 may be used to run concealed wires from the light 20 to existing electrical wiring in the vehicle.

The truck bed 18 has an interior bed wall 36 with an opening therein. The truck bed rail 16 also has an opening. The bed attachment assembly 14 securely attaches the supports 11 to the truck bed rail 16. The bed attachment assembly 14 comprises an L-shaped bolt 38 having a short leg 40 and a long leg 42. The long leg 42 is placed through the opening in the truck bed rail 16 and placed through a hole in the bed rail bracket 52. A nut 44 and plate 46 secure the long leg 42 of the L-shaped bolt 38 to the truck bed rail 16. A nut 54 and bolt 56 held by bed rail bracket 52 is attached to the supports 11 securely holding the supports 11 upright, preferably above a roof or cab of the vehicle. The short leg 40 of the L-shaped bolt 38 is securely held within the interior bed wall 36 of the truck bed 18 with bolt 48 and plate 50.

As illustrated in FIG. 1, the elevated accessory mounting platform 10 can easily be securely attached to the truck bed rail 16 through existing openings in the truck bed rail 16 and the interior bed wall 36. This provides an elevated accessory mounting platform 10 having a mounting surface 22 on which an accessory or light 20 can be securely attached.

The elevated accessory mounting platform 10 may also be used to hold a screen 57. The screen 57 may be positioned adjacent a window in the cab of the vehicle so as to protect a rear window from damage. The screen 57 is advantageously positioned adjacent the window without the need of placing additional holes are mounting hardware on the vehicle.

Figure 2:
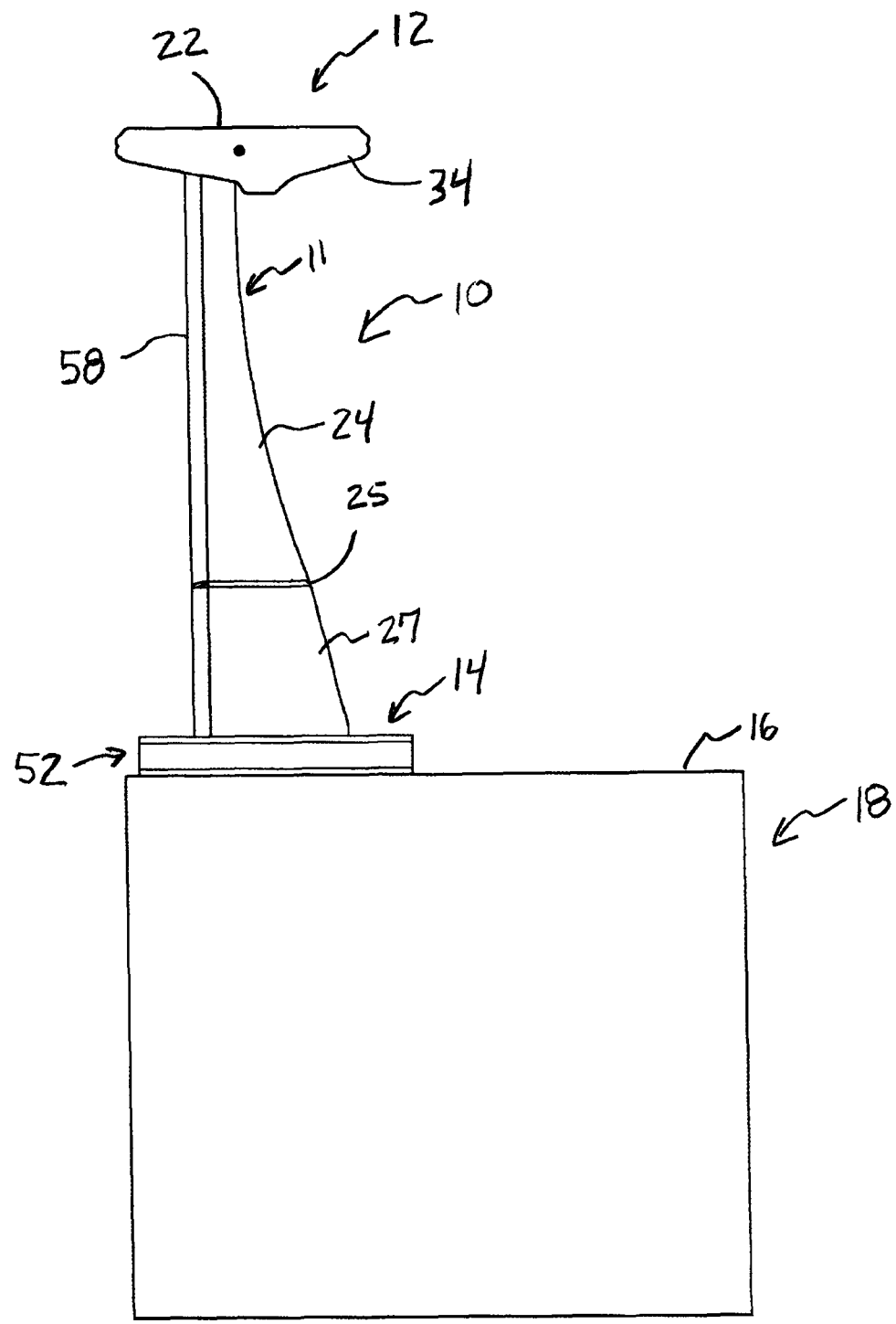
FIG. 2 is a side elevational view schematically illustrating the attachment of a mounting platform to the bed of a truck.

FIG. 2 is a side elevational view illustrating the attachment of the elevated accessory mounting platform 10 onto the truck bed 18. In FIG. 2 the front support 58 is more clearly illustrated. The bed attachment assembly 14 comprising a bed rail bracket 52 that may have a length greater than the lower vertical section side support 27. This greater length permits the lower vertical section side support 27 to be positioned at different points longitudinally along the length of the bed rail bracket 52.

The supports 11 may be folded sheet metal to provide the desired shape and size. For example, the side support 24 and the front support 58 may be folded or creased along a common edge forming a bend, which may preferably be 90°. Additionally, the lower vertical section 27 may be formed below the fold or crease 25.

Figure 3:
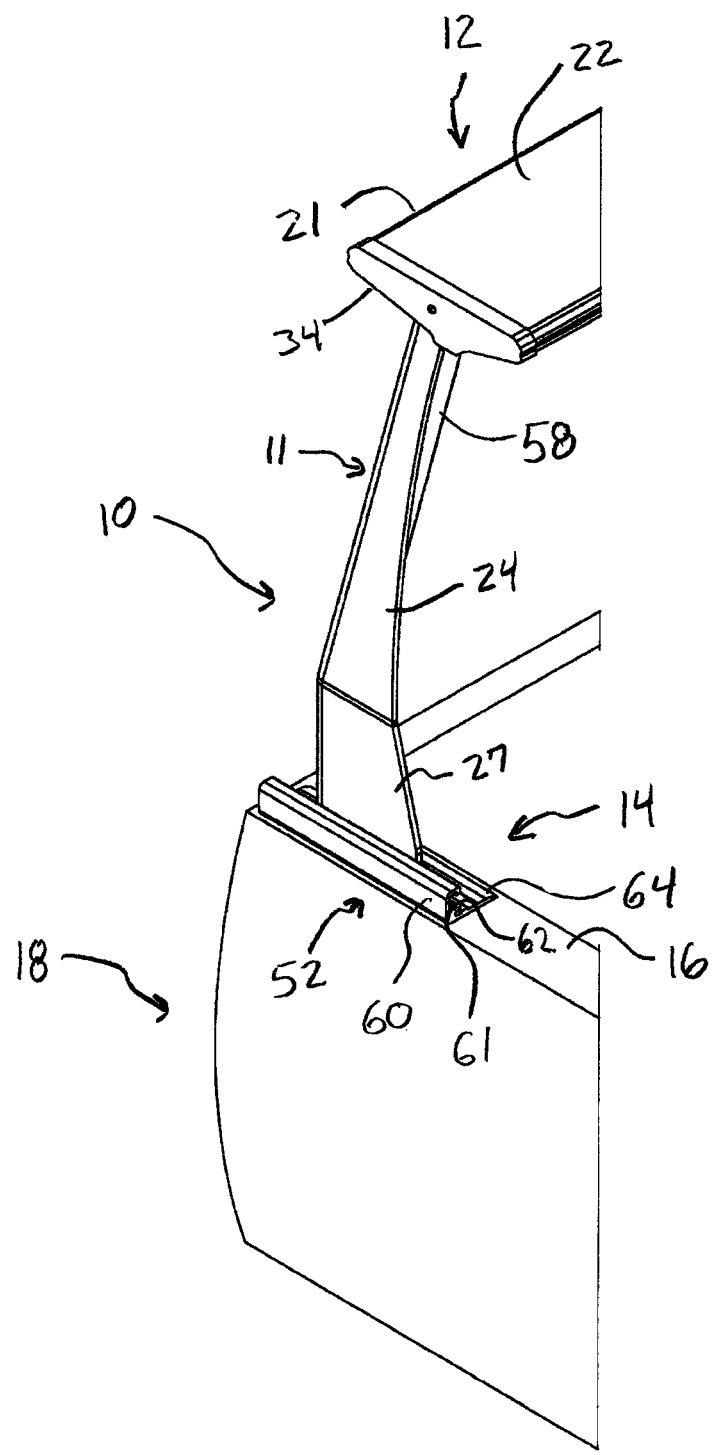
FIG. 3 is a perspective view schematically illustrating the attachment of a mounting platform to the bed of a truck.

FIG. 3 is a perspective view more clearly illustrating the bed attachment assembly 14 including the bed rail bracket 52. The bed rail bracket 52 has a vertical leg 60 and a horizontal leg 64. The horizontal leg 64 has a longitudinal channel 61 with a slot 62 formed therein. The horizontal leg 64 is attached to the truck bed rail 16 and the vertical leg 60 is attached to the lower vertical section 27 of the supports 11.

Figure 4:
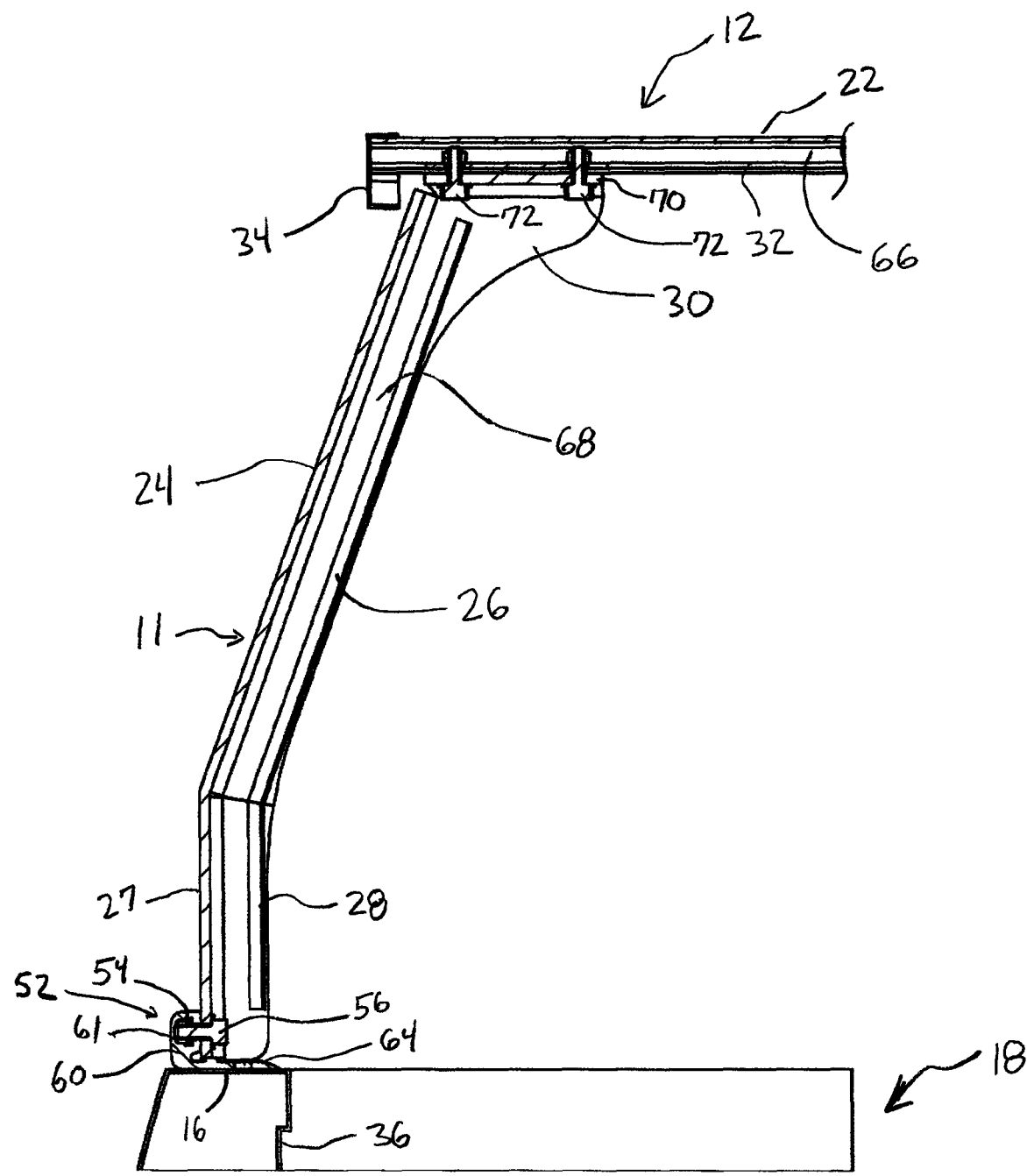
FIG. 4 is a rear partial section view of one side of the mounting platform.

FIG. 4 is a partial section of the supports 11 illustrating the vertical chase 26, lower vertical chase 28, and horizontal chase 32. Within the horizontal chase 32 is formed a platform channel 66. Within the vertical chase 26 and in the lower vertical chase 28 is formed a support channel 68. Wires from an accessory or light, not illustrated in FIG. 4, may run within the platform channel 66 and the support channel 68 and into the truck bed 18 for connected to an electric source, such as the vehicle's existing electric wiring.

FIG. 4 also illustrates the attachment of the platform assembly 12 to the supports 11. A support bracket 30 has a support top 70 forming a horizontal surface placed adjacent platform assembly 12. The support top 70 is attached to the platform assembly 12 with bolt 72.

FIG. 4 further illustrates the attachment of bed rail bracket 52 to the support 11. The lower vertical section 27 of the support 11 is positioned adjacent the inside of the vertical leg 60 of the rail bracket 52. A bolt 56 passes through a hole in the lower vertical section 27 and threads into a nut 54 that is captured within in the channel 61. The support 11 may be adjusted longitudinally along the bed rail bracket 52 to accommodate different vehicle configurations and then once positioned the bolt 56 is tightened pulling the vertical leg 60 of the bed rail bracket 52 tightly against the lower vertical section 27 locking it into position preventing relative movement between the bed rail bracket 52 and the support 11.

Figure 5:
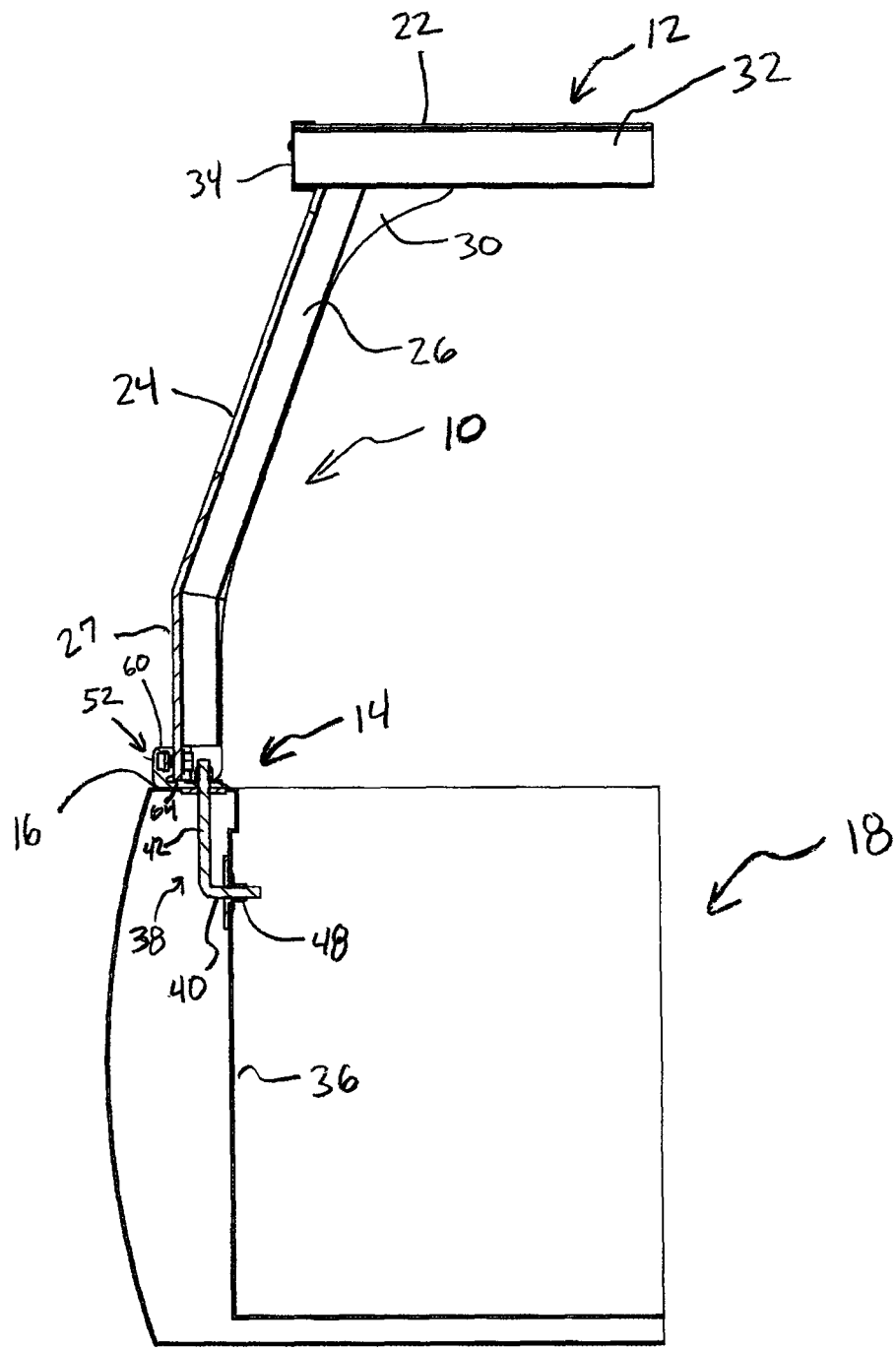
FIG. 5 is a rear partial section view of one side of the mounting platform illustrating the connection to the truck bed rail.

FIG. 5 more clearly illustrates the bed attachment assembly 14 attached to the truck bed rail 16. The L-shaped bolt 38 is placed within truck bed 18 with the short leg 40 extending through an opening in the interior bed wall 36. The long leg 42 extends through an opening in the truck bed rail 16 and a hole in the horizontal leg 64 of the bed rail bracket 52 and securely fixing the bed rail bracket 52 to the truck bed rail 16.

Figure 6:
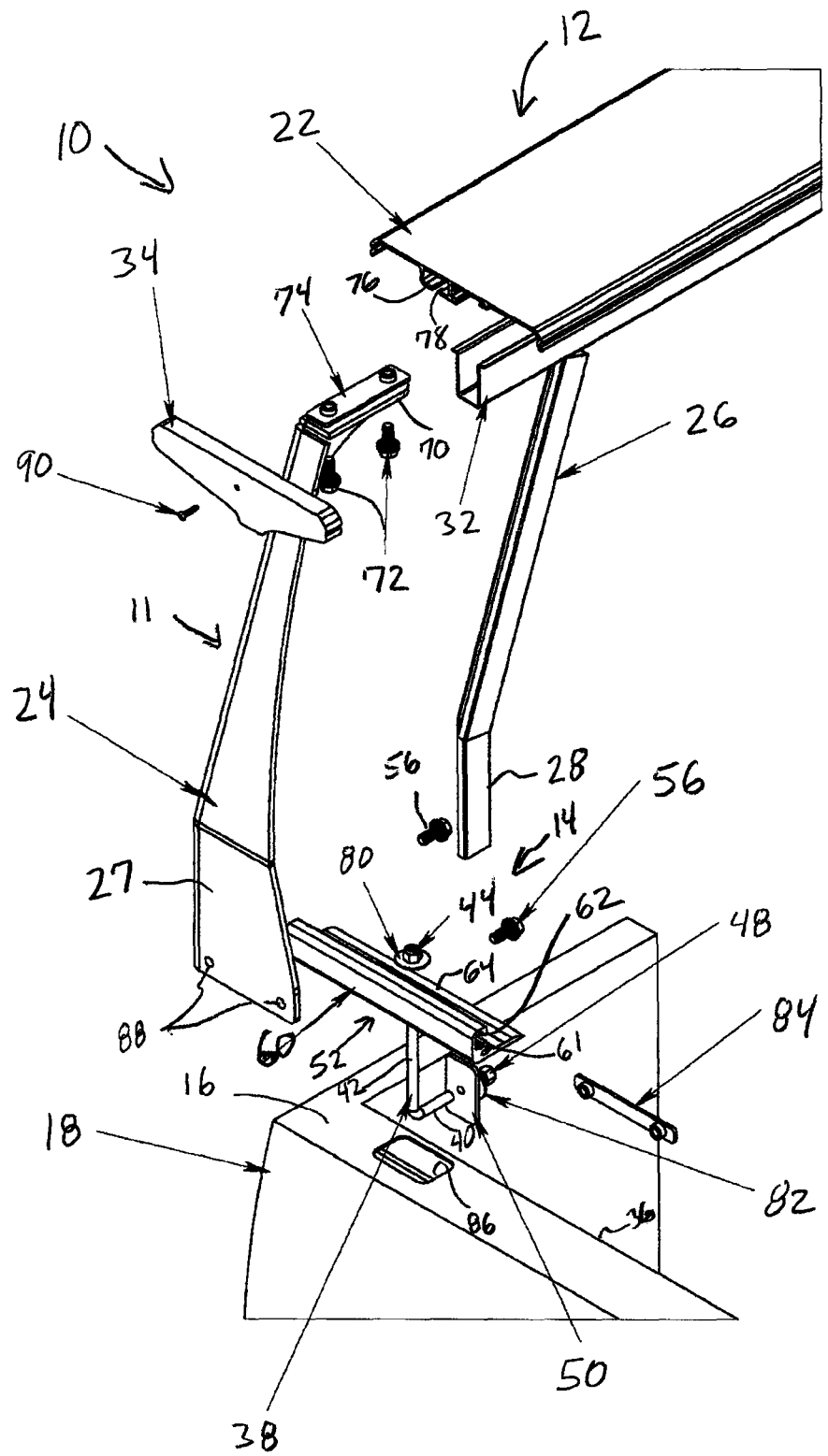
FIG. 6 it is an exploded perspective view of one side of the mounting platform.

FIG. 6 is an exploded perspective view clearly illustrating the bed attachment assembly 14 of the elevated accessory mounting platform 10 for attaching the supports 11 to the truck bed rails 16 of the truck bed 18 and the platform assembly 12 to the supports 11. The platform assembly 12 has a channel 76 with a slot 78. The support top 70 on the support 11 has a nut plate 74. The nut plate 74 slides within the channel 76 with the threaded portion of the bolts passing through the slot 78. After assembly of the mounting surface 22 onto the support top 70 the bolts 72 are tightened drawing in the net plate 74 against the channel 76 securely attaching the mounting surface 22 to the support 11. The horizontal chase 32 also attaches to the underside of the mounting surface 22. Once the platform assembly 12 is assembled the end cap 34 may be attached with screws 90.

FIG. 6 also clearly illustrates the attachment of the lower vertical section 27 of the support 11 to the truck bed rail 16 with the bed attachment assembly 14. The bed attachment assembly 14 comprises bed rail bracket 52 and L-shaped bolt 38. The short length 40 of the L-shaped bolt 38 is placed within the opening 86 in the truck bed rail 16. Opening 86 may be a stake hole commonly placed in the truck bed rail 16 by manufacturers for holding upright stakes or posts.

Plate 50 is preferably placed within the opening 86 with a threaded end of the short leg 40 extending through a hole in the inner bed wall 36. A nut 48 and washer 82 are placed on the threaded end of the short leg 40 adjacent the outer surface of the inner bed wall 36. The long leg 42 of the L-shaped bolt 38 extends through opening 86 and a hole in the horizontal leg 64 of the bed rail bracket 52. A washer 80 and nut 44 are placed on the threaded end of the long leg 42 of the L-shaped bolt 38. This securely affixes the bed rail bracket 52 to the truck bed rail 16.

To secure the lower vertical section 27 of the support 11 onto the bed rail bracket 52, bolt holes 88 in the lower vertical section 27 are placed on the inner side of the bed rail bracket 52 adjacent the slot 62 of the channel 61 on the vertical leg 60 of the bed rail bracket 52. Nut plate 84 is placed within channel 61 and aligned with the bolt holes 88. The threaded portion of bolts 56 are placed through the bolt holes 88 and the slot 62 to attach to the nut plate 84. The bolts 56 are then tightened into the nut plate 76 forcing the lower vertical section 27 against the vertical leg 60 of the bed rail bracket 52. This fixes the support 11 securely in position.

Figure 7:
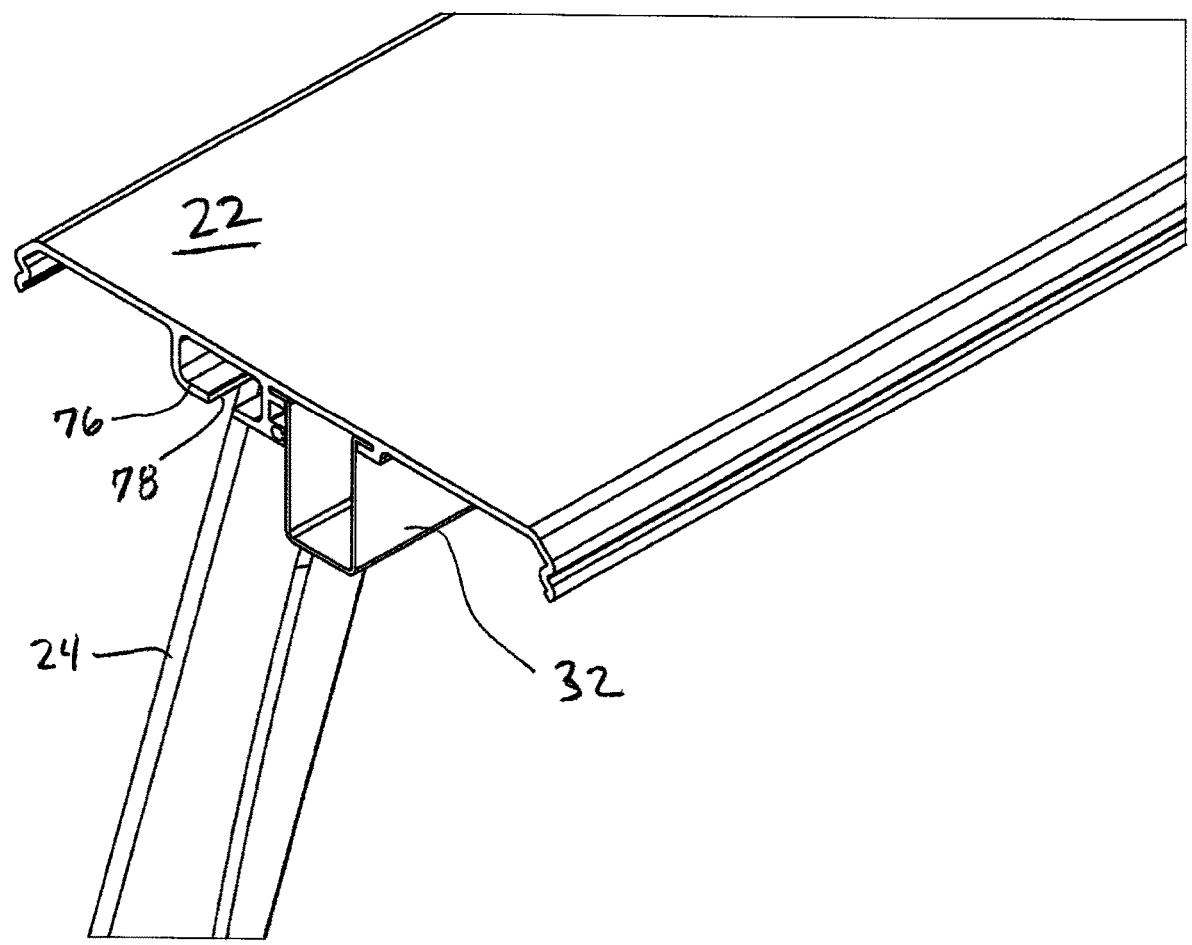
FIG. 7 is an enlarged view of the platform connected to a support.

FIG. 7 is a perspective view illustrating the structure of the mounting surface 22 with the horizontal chase 32 attached. Also illustrated is the channel 76 and slot 78 formed within the underside of the mounting surface 22.

Figure 8:
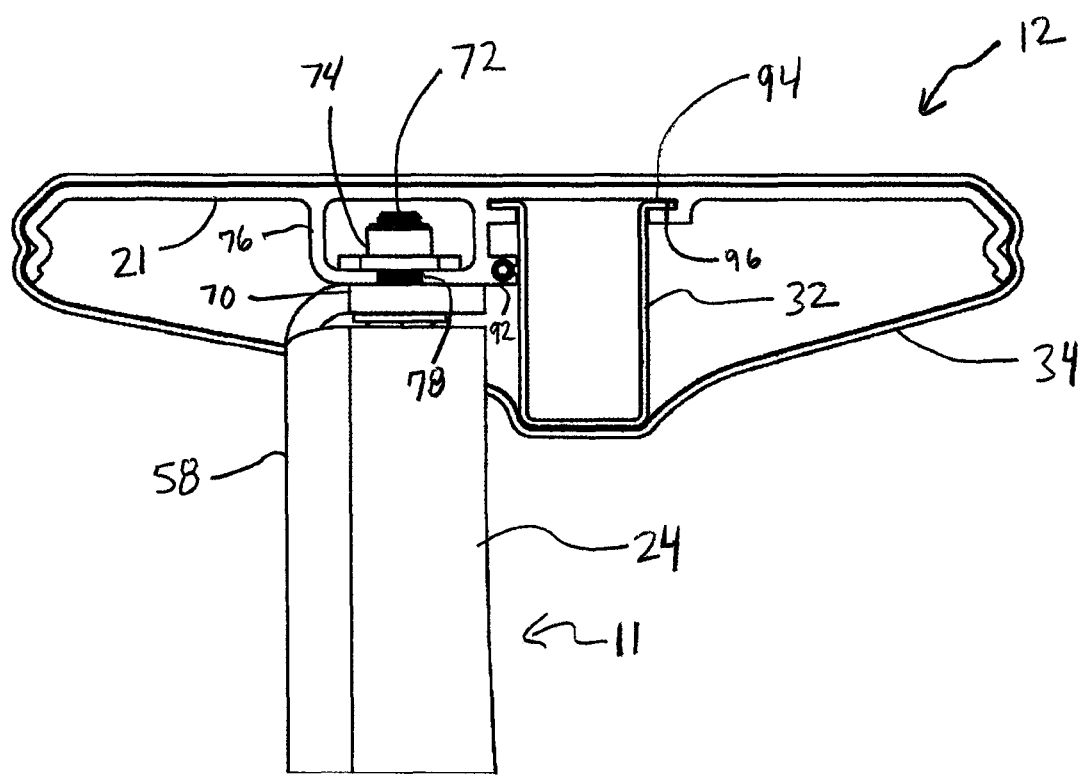
FIG. 8 is a lateral section end view of the platform assembly.

FIG. 8 schematically illustrates the platform assembly 12 attach to the support 11. The support top 70 has a hole through which the treaded end of bolt 72 passes. Bolt 72 also passes through slot 78 formed in the channel 76. Nut plate 74 placed within the channel 76 is attached to the threaded end of bolt 72. Upon tightening the bolt 72 the support top 70 is securely drawn against a leg of the channel 76 securely holding the platform assembly 12 to the support 11. Horizontal chase 32 is attached to the platform assembly 12 and platform 21 by positioning leg 96 into the slot 94. Screw hole 92 is formed in the platform 21 and is used to attach the end cap 34.

Figure 9:
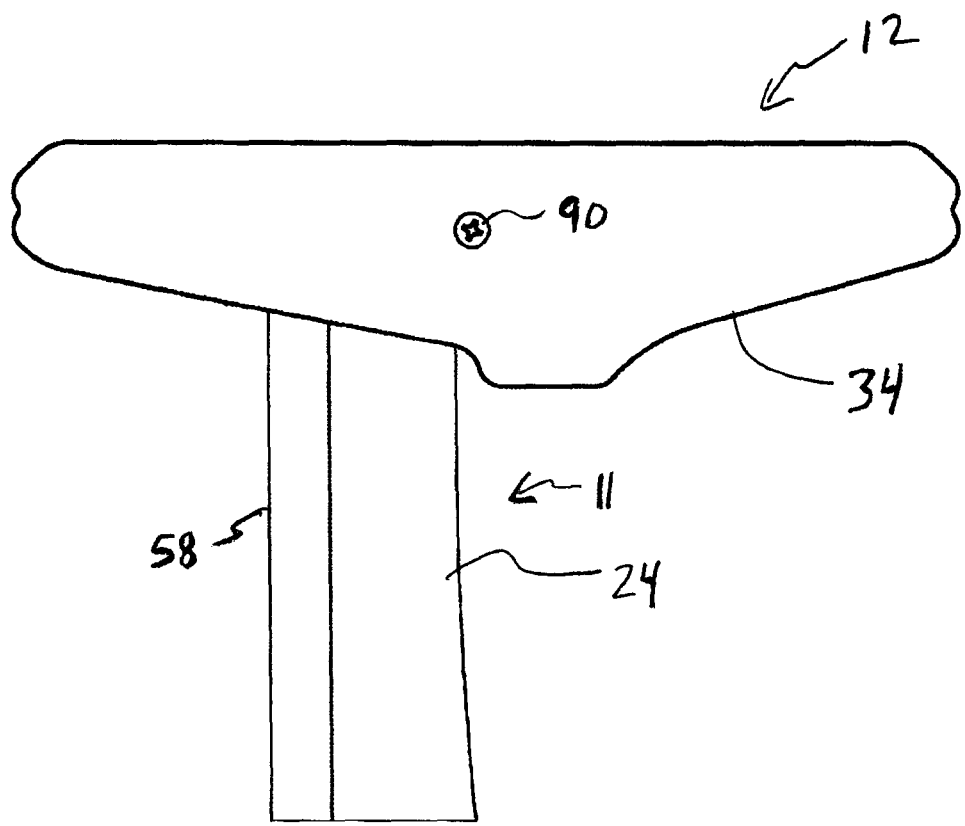
FIG. 9 is an end view of the platform assembly.

FIG. 9 schematically illustrates the assembled platform assembly 12 with screw 90 holding the end cap 34 in place. The mounting surface of the platform assembly 12 is elevated and securely held by the support 11.

The present invention provides an elevated mounting platform that may be used for attaching accessories, such as emergency lights. The bed attachment assembly used to attach the supports to the truck bed rail uses existing openings found in the truck bed and therefore does not require any modification to the vehicle. The present invention provides a secure attachment of the elevated mounting platform that can quickly and easily be attached and detached depending upon need. The bed attachment assembly also provides longitudinal movement for positioning the supports closer to or further from the cab of the vehicle or truck to accommodate different vehicle configurations.

While the present invention has been described with respect to several different embodiments, it will be obvious that various modifications may be made without departing from the spirit and scope of this invention.

What is claimed is:

1. A method of attaching an elevated platform to a vehicle having a bed with opposing top bed rails with existing bed rail top openings and an interior bed side wall with existing interior bed side wall through openings comprising the steps of:
    placing a bed rail bracket over each of the top bed rails over the existing bed rail top opening;
    fixing the bed rail bracket to each of the opposing bed rails with a bed attachment assembly comprising an L-clamp assembly with a vertical leg extending through one of the existing bed rail top openings and a horizontal leg extending through one of the existing interior bed side wall through openings;
    attaching a vertical support to each bed rail bracket; and
    attaching a platform between each vertical support,
    whereby an accessory is capable of being mounted on said platform elevated above the vehicle.

2. A method of attaching an elevated platform onto a vehicle as in claim 1 further comprising the step of:
    mounting an emergency light on the platform.

3. A method of attaching an elevated platform onto a vehicle as in claim 1 further comprising the step of:
    mounting a window guard on the platform.

4. A mounting platform for attachment to a vehicle comprising:
    two L-clamp assemblies bolted into forward stake pockets of a pick-up bed;
    two base rails attached to the top of the truck bed rail using said two L-clamp bolts;
    two upright sections extending from the top of the truck bed rail to a height of a cab roof of the vehicle; and
    a mounting platform spanning across said two upright sections;
    wherein said two L-clamp assemblies comprise a 90 degree $\frac{3}{8}$" bent stainless steel rod, $4\frac{1}{2}$" vertical leg, 2" horizontal leg, 1" threaded ends; and
    said two L-clamp assemblies include two aluminum shapes each having dimensions of $2\frac{1}{2}$"×$1\frac{1}{2}$"×$\frac{1}{8}$", radius corners, and $\frac{3}{8}$" threaded hole at the center with a shoulder having dimensions of $\frac{1}{16}$"×$1\frac{1}{16}$",
    whereby an accessory may be mounted on the mounting platform and the mounting platform may be attached to the vehicle without the drilling of any holes.

5. A mounting platform for attachment to a vehicle as in claim 4 wherein:
    said two L-clamp assemblies are configured to insert vertically into a stake pocket and projects out through an existing hole; and
    said aluminum shapes threaded onto said two L-clamp assemblies on center in the existing hole and center of the stake pocket hole.

6. A mounting platform for attachment to a vehicle as in claim 4 further comprising:
    a light bar having a spot light attached to said mounting platform.

7. A mounting platform for attachment to a vehicle as in claim 4 wherein:
    a window guard attached to said mounting platform.

8. An elevated accessory mounting platform for a vehicle having a bed with two opposing truck bed rails with rail openings and opposing interior bed walls with interior bed wall openings comprising:
    two bed rail brackets, each of said two bed rail brackets configured to, be positioned adjacent one of the rail openings;
    two L-shaped bolts each having a first leg and a second leg, each of the two L-shaped bolts having the first leg configured to extend through one of the interior bed wall openings, and the second leg configured to extend through one of the rail openings and attach to a respective one of said two bed rail brackets;
    a pair of supports, each one of said pair of supports configured to attach to a respective one of said two bed rail brackets; and a platform having a mounting surface adapted to extend between and attach to said pair of supports, whereby an accessory is capable of being mounted on said platform elevated above the vehicle.

9. An elevated accessory mounting platform as in claim 8 wherein:

said two bed rail brackets each comprise a vertical leg and a horizontal leg, the horizontal leg having a hole configured to receive the second leg of one of said two L-shaped bolts and a channel configured to receive a nut attached to the second leg of one of said two L-shaped bolts, whereby said bed rail brackets are configured to be positioned longitudinally along the truck bed rail and the vertical leg having a slot configured to receive a nut, whereby said pair of supports are configured to be positioned longitudinally along said bed rail brackets.

10. An elevated accessory mounting platform as in claim 8 wherein:

said platform comprises a channel formed adjacent a surface opposite of the mounting surface and extending from an end of the said platform to an opposing end of said platform, the channel configured to receive a nut plate attached each of said pair of supports, and a horizontal chase adjacent the channel.

11. An elevated accessory mounting platform as in claim 10 further comprising:

a vertical chase extending along each one of said pair of supports from the horizontal chase to a respective one of said two bed rail brackets.

12. An elevated accessory mounting platform as in claim 8 further comprising:

an emergency light mounted on said platform.

13. An elevated accessory mounting platform as in claim 8 further comprising:

a window guard mounted on said platform.

* * * * *